(12) United States Patent
Golomb

(10) Patent No.: US 9,669,557 B2
(45) Date of Patent: Jun. 6, 2017

(54) FOOD CUTTING, FOOD STORAGE, AND FOOD SERVING SYSTEM

(71) Applicant: Jordan Rivard Golomb, Maple Grove, MN (US)

(72) Inventor: Jordan Rivard Golomb, Maple Grove, MN (US)

(*) Notice: Subject to any disclaimer, the term of this patent is extended or adjusted under 35 U.S.C. 154(b) by 336 days.

(21) Appl. No.: 14/501,108

(22) Filed: Sep. 30, 2014

(65) Prior Publication Data
US 2015/0165634 A1    Jun. 18, 2015

Related U.S. Application Data

(60) Provisional application No. 61/884,519, filed on Sep. 30, 2013.

(51) Int. Cl.
*A47J 25/00*    (2006.01)
*B26D 3/26*    (2006.01)
*A47J 47/14*    (2006.01)

(52) U.S. Cl.
CPC ............... *B26D 3/26* (2013.01); *A47J 25/00* (2013.01); *A47J 47/14* (2013.01); *Y10T 83/04* (2015.04); *Y10T 83/222* (2015.04)

(58) Field of Classification Search
CPC .. A47J 25/00; A47J 47/14; B26D 3/26; Y10T 83/04; Y10T 83/222
USPC ........ 30/113.1–113.3, 279.2, 280, 281, 302, 30/303; 88/167; 99/537, 538; D7/672, D7/673; 8/13, 167
See application file for complete search history.

(56) References Cited

U.S. PATENT DOCUMENTS

| | | | |
|---|---|---|---|
| 5,216,031 A * | 6/1993 | Dobson .................... | B26D 3/22 83/865 |
| 7,150,214 B2 * | 12/2006 | Repac ..................... | A47J 19/04 241/168 |
| 2010/0005978 A1* | 1/2010 | Hoffman ................. | A47J 25/00 99/538 |
| 2010/0224041 A1* | 9/2010 | Melton .................... | B26D 1/09 83/13 |
| 2011/0252647 A1* | 10/2011 | Pau ......................... | B26D 3/24 30/124 |

* cited by examiner

*Primary Examiner* — William Gilbert
(74) *Attorney, Agent, or Firm* — Jordan R. Golomb

(57) ABSTRACT

Exemplary systems and methods for storing a food item prior to cutting, for cutting the food item, and for supporting the food item for serving to a user after it has been cut are described herein. The exemplary system may include a cutting apparatus removably couplable to an open end of a collapsible apparatus having a collapsible region between the open end and a base. The system may be configured to store the food item until cut. Upon application of a sufficient compressive force, the collapsible apparatus collapses and causes the food item to be cut and moved out of the collapsible apparatus through the cutting apparatus. The system is configured to operate while maintaining the coupling between the cutting apparatus and the collapsible apparatus in all of a food storage configuration, a food cutting configuration and a food serving configuration, and transitions therebetween.

20 Claims, 9 Drawing Sheets

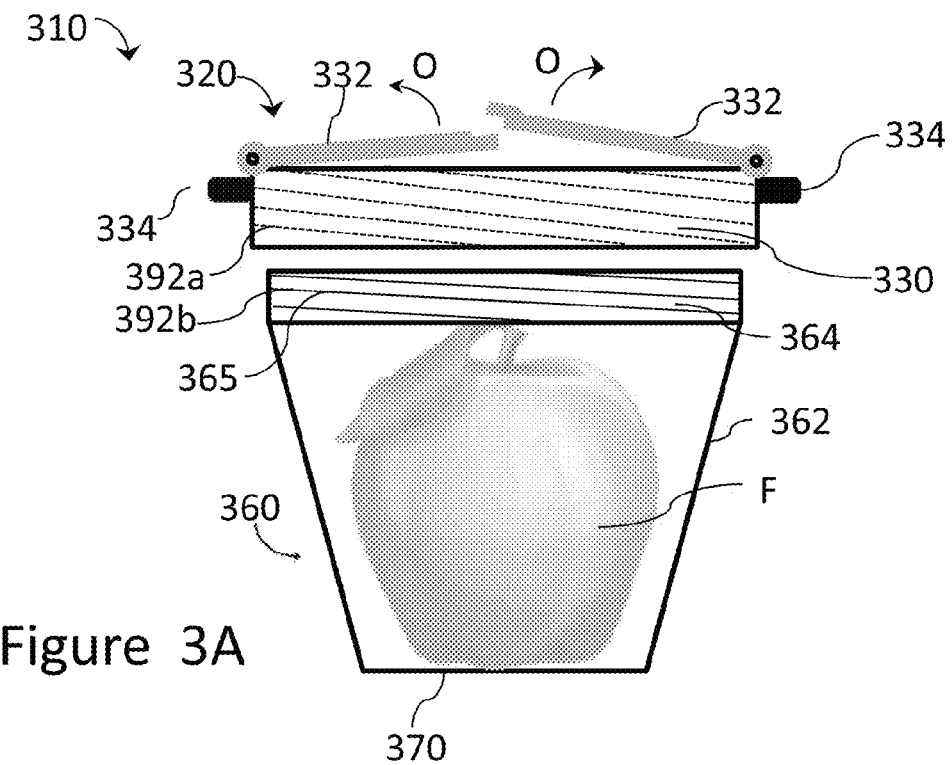
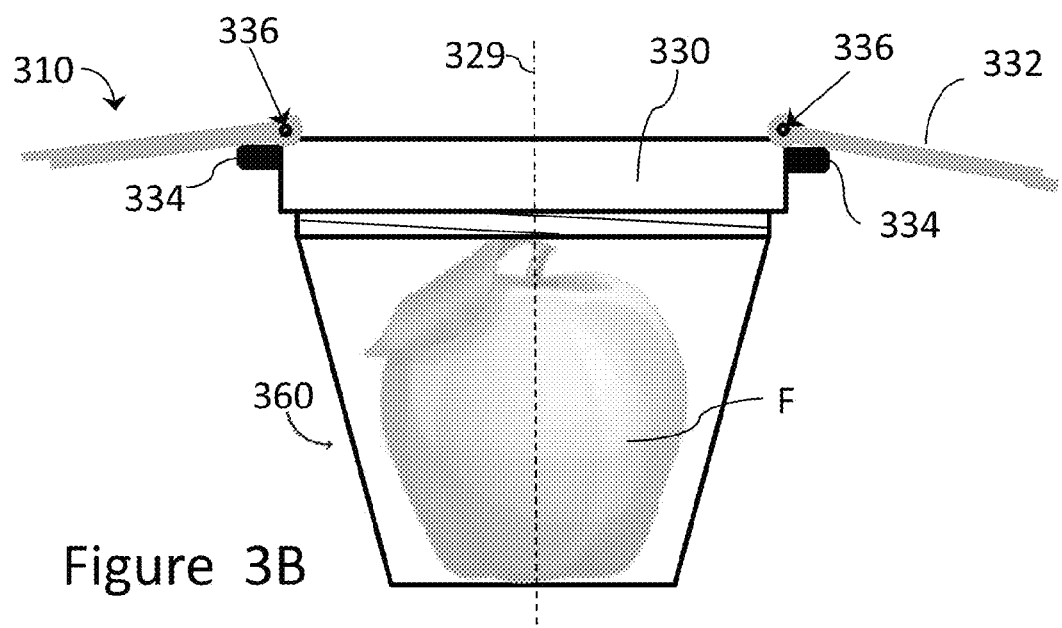

FOOD CUTTING, FOOD STORAGE, AND FOOD SERVING SYSTEM

CROSS-REFERENCE TO RELATED APPLICATION

This application claims the benefit of U.S. Provisional Application No. 61/884,519, filed Sep. 30, 2014.

BACKGROUND

Systems for cutting, wedging or slicing food including fruits, vegetables, meats or cheese, especially devices for cutting apples into sections have existed for many years. Unfortunately, a drawback to many conventional food slicing devices, and in particular, apple slicing devices, is that such apple slicers are not easily portable.

Conventional apple slicers do not enclose a food item for sanitary travel, and they do not provide the user a sanitary surface on which to place the food item during the cutting process. A user has to provide a separate cutting surface such as a plate. Conventional apple slicers also do not protect the user from the cutting blade during travel, storage of the food item in the slicer apparatus and during the cutting process.

Not all individuals can eat food items, such as an apple or pear in their whole form, but do desire the whole, unprocessed food nutrition. For example individuals trying to eat a healthy diet, but who do not enjoy eating a whole apple may still enjoy eating a sliced apple. Also, people of all ages with dental problems may have difficulty eating an apple in its whole state, but they may still be able to eat a sliced apple. For example, people with chipped teeth, children with loose or missing teeth, people with dentures, and the elderly.

Many people also desire whole, unprocessed food nutrition on the go. For example, at sports activities, school, work, or while traveling, etc. Additionally, parents and caregivers often struggle to find snacks that kids like to eat, are healthy, economical, and do not include common allergens banned from many schools.

Packaged pre-cut apples are available, but these contain preservatives, may not be available as an organic product, and come in a very limited variety. Packaged pre-cut apples also have shorter shelf life than whole apples, they still require refrigeration and do not taste as fresh. Accessibility is also a problem with packaged pre-cut apples. Packaged pre-cut apples are not as readily available and easily accessible as whole apples; not all stores that carry apples also carry packaged pre-cut apples.

SUMMARY

The problems with storing food items for travel and for cutting and serving food items on the go may be addressed by the exemplary systems and methods described herein. For example, the exemplary systems and methods are able to protect and store a food item during travel, the storage system incorporating both a cutting apparatus and sanitary surface on which to cut and serve the food item, all in one elegant system. Furthermore, no decoupling of the components of the system may be required to transition from storing, to cutting, to serving the food item.

One exemplary system for storing a food item prior to cutting, for cutting the food item, and for supporting the food item after it has been cut may include a cutting apparatus comprising an outer frame defining an interior cutting region, wherein the interior cutting region comprises one or more blades being supported by the outer frame. The collapsible apparatus may include a base configured to support the food item during the cutting process, an open end portion (e.g., a rigid ring or frame), and a collapsible region, wherein the collapsible region extends (e.g., spans the space or distance) between the base and the open end portion. The cutting apparatus may be removably couplable to the open end portion of the collapsible apparatus.

In at least on embodiment, the blades include a sharpened end (e.g., chamfered edge) facing the base of the collapsible apparatus (e.g., direction of collapsible region) in any or all of a food storage configuration, a food cutting configuration, and a food serving configuration.

In at least one embodiment, the system is configured to operate while maintaining the coupling (e.g., fixed or substantially fixed coupling) between the cutting apparatus and the open end portion of the collapsible apparatus in all of a food storage configuration, a food cutting configuration, and a food serving configuration.

One exemplary system for storing a food item prior to cutting, for cutting the food item in a cutting process, and for supporting the food item after it has been cut may include a cutting apparatus including an outer frame defining an interior cutting region. The interior cutting region may include one or more blades being supported by the outer frame. The exemplary system may further include a collapsible apparatus including a base configured to support the food item during the cutting process, an open end portion, and a collapsible region. The collapsible region may extend between the base and the open end portion, and the collapsible region is configured to collapse during the cutting process. The system is couplable such that the cutting apparatus is removably couplable to the open end portion of the collapsible apparatus. The coupled system including a first configuration having a first volume and a first height, and a second configuration having a second volume and a second height, such that the first volume is greater than the second volume, and the first height is greater than the second height. In addition, when the cutting apparatus is coupled to the collapsible apparatus, the cutting apparatus may be closer to the base in the second configuration than in the first configuration.

In one or more embodiments, the first configuration may be a food storage configuration and the second configuration may be a food serving configuration and further wherein the transition between the first configuration and second configuration may be a food cutting configuration.

In one or more embodiments, the open end of the collapsible apparatus comprises at least a portion of a coupling mechanism configured to allow coupling of the cutting apparatus to the collapsible apparatus.

In one or more embodiments, the base of the collapsible apparatus of the base may include one or more projections. The projections may include a height extending from a top surface of the base towards the open end of the collapsible apparatus, and when the cutting apparatus and the collapsible apparatus are in the fully collapsed configuration, the blades occupy the space in between, but the blades may not come into contact with the protrusions.

In many embodiments, the second height is at least 51% less than the first height. In some embodiments, the second height may be further defined to be at least 65% less than the first height.

In one or more embodiments, a cross section of the collapsible apparatus in the second configuration taken along a plane perpendicular or substantially perpendicular to the plane of the base perpendicular or substantially perpendicular to the plane of the open end the collapsible apparatus includes a zig-zag portion.

In one or more embodiments, at least one of the blades may include a sharpened end (e.g., edge) facing the base of the collapsible apparatus in all of the food storage configuration, the food cutting configuration, and the food serving configuration.

In one or more embodiments, at least one of the blades comprises a chamfer (e.g., knife-like) on the edge of the blade facing the base when the cutting apparatus is coupled to the collapsible apparatus.

In or more embodiments, the cutting apparatus does not move relative to the open end of the collapsible apparatus in all of a food storage configuration, a food cutting configuration, and a food serving configuration.

In one or more embodiments, the cutting apparatus does not move relative to the open end portion of the collapsible apparatus during the cutting process.

In one or more embodiments, the cutting apparatus comprises handles configured to receive and transfer the force to cut the food item, and further wherein the handles also provide at least a partial covering of the interior cutting region.

In one or more embodiments, the collapsible apparatus is made of a resilient material, including, but not limited to, silicone.

In one or more embodiments, a gap is maintained between the blades and the collapsible region when the cutting apparatus is coupled to the collapsible apparatus in any or all of the food storage configuration, the food cutting configuration and food serving configuration.

In one or more embodiments, the base comprises a food retention feature configured to receive, pierce and retain the food item in the food storage configuration.

One or more exemplary methods for storing a food item prior to cutting the food item, for cutting the food item, and for supporting the food item after it has been cut may include providing a collapsible apparatus comprising a base configured to support the food item during a cutting process. The collapsible apparatus may include an open end portion, a base, and a collapsible region. The collapsible region may be coupled or affixed to and extend (e.g., span the space or distance) between the base and the open end portion (e.g., from the base to the open end portion, or from the top surface of the base (e.g., the surface opposite the bottom surface which supports the food item), to the proximal surface (bottom) of the open end portion. Prior to placing the food item into the collapsible apparatus, the collapsible apparatus may be expanded. Once the collapsible apparatus is expanded the food item may be placed into the collapsible apparatus (however, it may be possible for the food item to be placed into the collapsed collapsible apparatus, and then expand the collapsible apparatus afterward). Then, a cutting apparatus including an outer frame defining an interior cutting region may be coupled to the collapsible apparatus. The interior cutting region may include one or more blades (or wires, etc.) being supported by the outer frame. Then, the collapsible apparatus may be collapsed such that collapsing the collapsible apparatus results in the food item being cut and passing at least a portion of the food item through the interior cutting region and out of (e.g., mostly out of or substantially out of, the collapsible apparatus. Collapsing the collapsible apparatus results in the system being reduced from a first configuration having a first height and first volume to a second configuration having a second height and second volume, the first height may be greater than the second height, and the first volume may be greater than the second volume.

In one or more embodiments, the cut food item may be presented to a user when the collapsible apparatus is in a collapsed configuration without de-coupling the cutting apparatus from the collapsible apparatus.

In one or more embodiments, the food item may be pierced with a food retention feature of the base when placing the food item into the collapsible apparatus. Piercing the food item with the food retention feature may retain the food item (e.g., in a desired orientation) during travel.

In one or more embodiments of a method, when collapsing the system, the second height is at least 51% less than the first height. In one or more embodiments of the method, the second height is at least 65% less than the first height. A range of reduction in heights and volumes is possible depending on the characteristics of the embodiment. The range of reduction in heights and volumes is further described herein.

Exemplary systems and methods for storing a food item prior to cutting, for cutting the food item, and for supporting the food item for serving to a user after it has been cut are described herein. The exemplary system may include a cutting apparatus removably couplable to an open end of a collapsible apparatus having a collapsible region between the open end and a base. The system may be configured to store the food item until cut. Upon application of a sufficient compressive force, the collapsible apparatus collapses and causes the food item to be cut and be moved out of the collapsible apparatus passing through and out of or mostly (e.g., substantially) out of the cutting apparatus. The system is configured to operate while maintaining the coupling between the cutting apparatus and the collapsible apparatus in all of a food storage configuration, a food cutting configuration and a food serving configuration, and all transitions therebetween.

The above summary is not intended to describe each embodiment or every implementation of the present disclosure. A more complete understanding will become apparent and appreciated by referring to the following detailed description and claims taken in conjunction with the accompanying drawings.

BRIEF DESCRIPTION OF THE DRAWINGS

FIG. 3A is a de-coupled assembly side view of another exemplary system for storing, cutting and serving a food item in an expanded or food storage configuration with handles in a storage position or food covering orientation.

Note: portions of the embodiment are shown translucent, and a food item is depicted in the system for the sake of clarity.

FIG. 3B is a side view of the coupled system of FIG. 3A with the handles in a food cutting configuration or opened orientation.

Figure 4A:
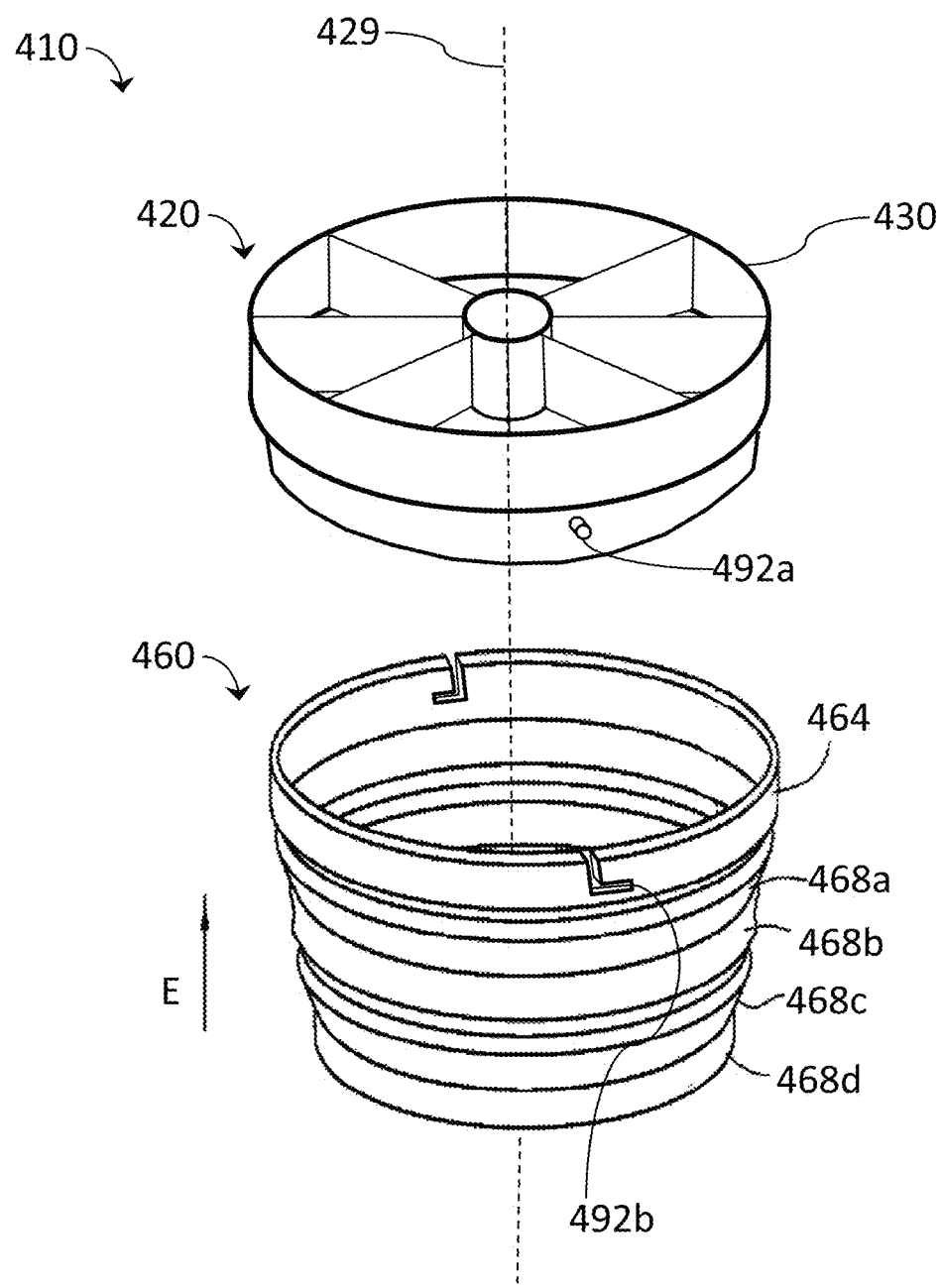

FIG. 4A is perspective view of another exemplary system for storing, cutting and serving a food item in an expanded and de-coupled configuration.

Figure 4B:
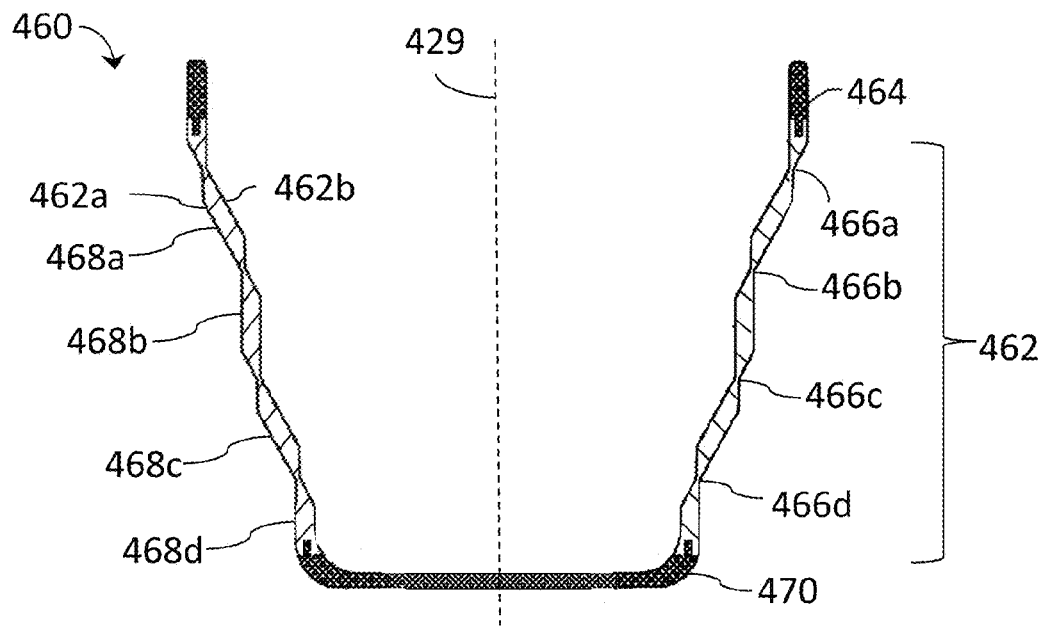

FIG. 4B is a sectional view of the collapsible apparatus of the exemplary system of FIG. 4A in the expanded and de-coupled configuration taken along a diameter line passing through the central axis of the collapsible apparatus.

Figure 4C:
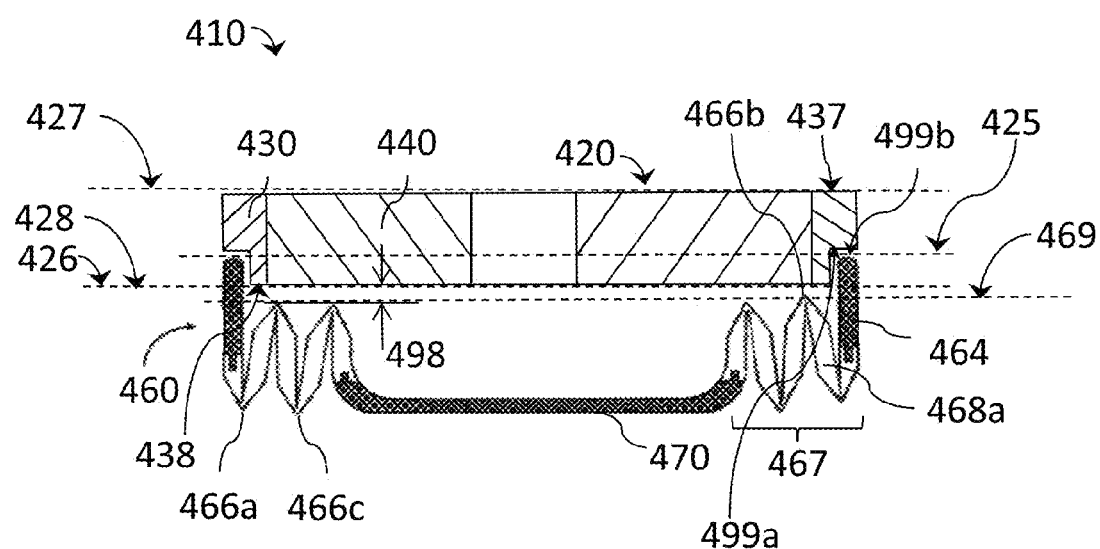

FIG. 4C is a sectional view of the collapsible apparatus of FIG. 4A in a collapsed configuration taken along a diameter line passing through the central axis of the collapsible apparatus. An exemplary embodiment of a cutting apparatus is also provided.

Figure 5:
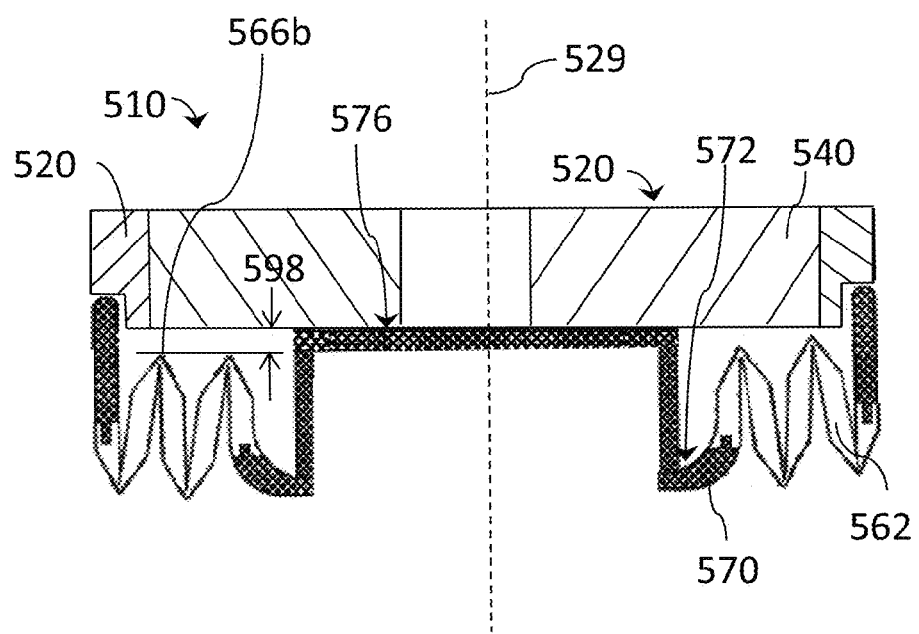

FIG. 5 is a sectional view of another exemplary collapsible apparatus in a collapsed configuration taken along a diameter line passing through the central axis of the collapsible apparatus including an alternate base design. Note: the cutting apparatus of FIG. 4C is also provided, for the sake of clarity.

Figure 6A:
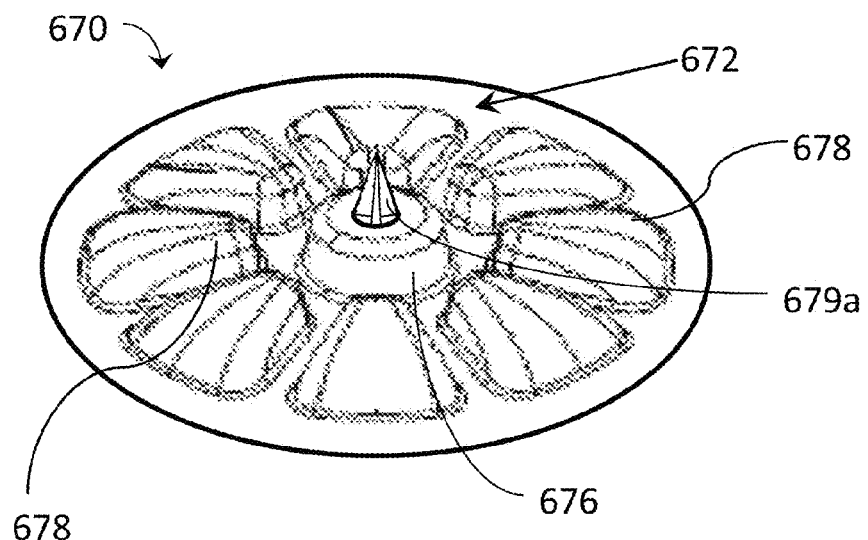

FIG. 6A is a close-up perspective view of an embodiment of a base of a collapsible apparatus of an exemplary system.

Figure 6B:
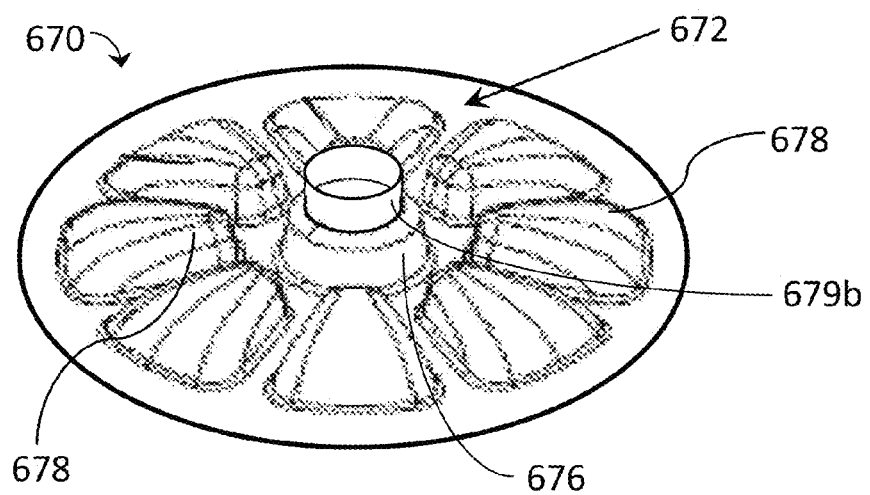

FIG. 6B is a close-up perspective view of another embodiment of a base of a collapsible apparatus of an exemplary system.

Figure 7:
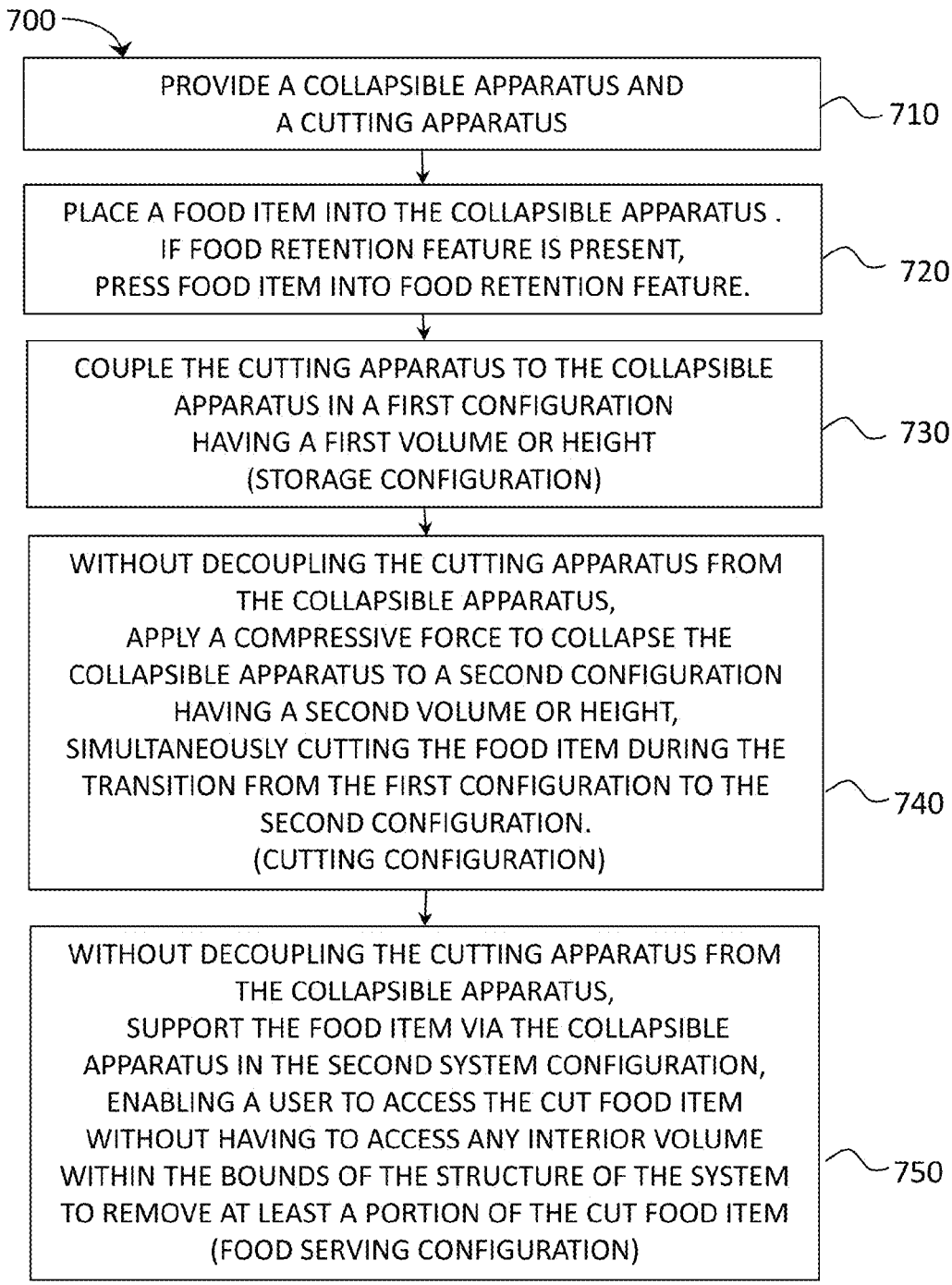

FIG. 7 is a flow chart of a exemplary method for storing, cutting and serving a food item.

DETAILED DESCRIPTION OF EXEMPLARY EMBODIMENTS

In the following detailed description of illustrative embodiments, reference is made to the accompanying figures of the drawing which form a part hereof, and in which are shown, by way of illustration, specific embodiments which may be practiced. It is to be understood that other embodiments may be utilized and structural changes may be made without departing from (e.g., still falling within) the scope of the disclosure presented hereby.

Exemplary embodiments shall be described with reference to FIGS. 1-7. It will be apparent to one skilled in the art that elements (e.g., apparatus, structures, parts, portions, regions, configurations, functionalities, method steps, materials, etc.) from one embodiment may be used in combination with elements of the other embodiments, and that the possible embodiments of such apparatus, systems and methods using combinations of features set forth herein is not limited to the specific embodiments shown in the figures and/or described herein. Further, it will be recognized that the embodiments described herein may include many elements that are not necessarily shown to scale. Still further, it will be recognized that the size and shape of various elements herein may be modified but still fall within the scope of the present disclosure, although certain one or more shapes and/or sizes, or types of elements, may be advantageous over others.

Exemplary systems for storing a food item, cutting a food item and supporting a food item for serving are described herein. Generally, the exemplary apparatus may include a cutting apparatus and a collapsible apparatus that may be configured to contain, store and protect a food item until the user decides to cut it. For example, the food may be stored (e.g., in transit from home to work or school, while traveling, en route to a picnic or sports events, etc.) in its whole, or mostly whole form inside the system until the user wishes to cut the food item. When the user decides to cut the food item, the user may do so by applying a compressive force to the system, collapsing the collapsible apparatus, and in the process of collapsing, causing the food item to be cut and move out (e.g. completely, mostly or substantially move out) of the system/collapsible apparatus through the cutting apparatus.

The exemplary system and apparatus may be described in terms of various configurations or states. As described, the states of the system may also apply to the individual structures thereof. For example, when the food item is stored inside the system and the collapsible container in its expanded state (e.g., fully, mostly or substantially expanded state), it may be described herein that the system is in, or is configured in, a food storage configuration (e.g., expanded, non-collapsed, uncollapsed, substantially expanded, or mostly expanded configuration).

When the food item is stored inside the system, and the food item is in the process of being cut with the collapsible container in an intermediate cutting configuration, (e.g., partially collapsed, partially expanded), it may be described herein that the system (or structures thereof) is in, or is configured in, a food cutting configuration.

Figure 1A:
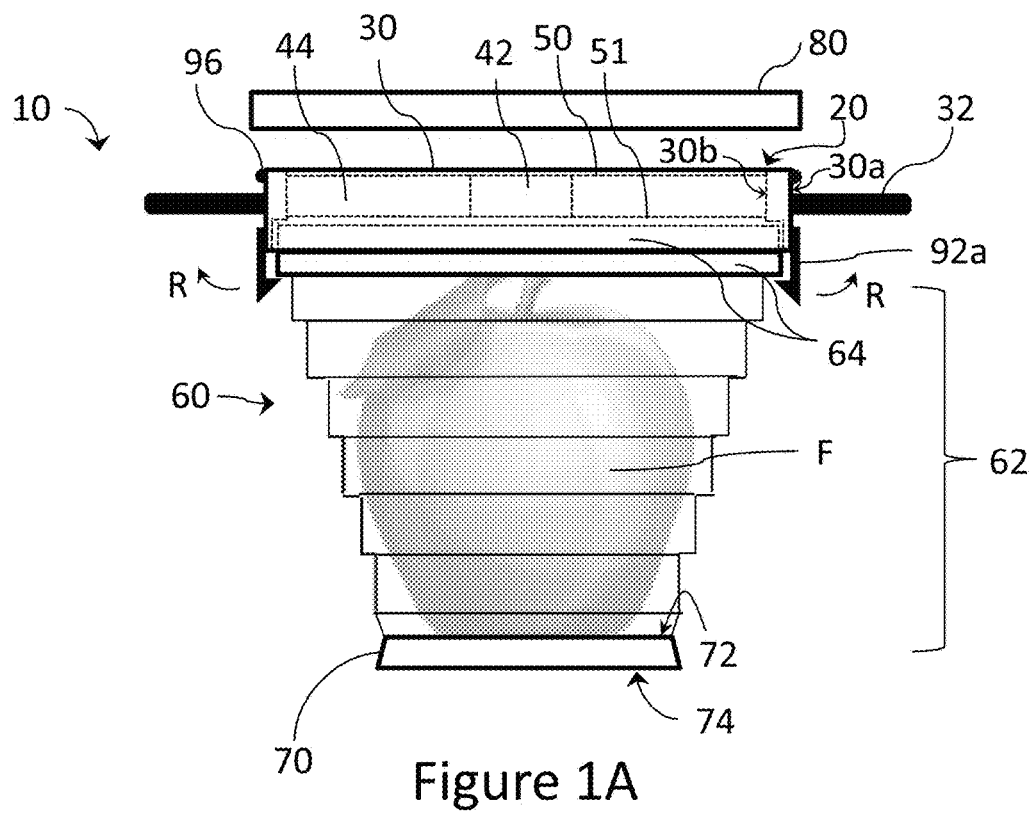
FIG. 1A is a side view of an exemplary system for storing, cutting and serving a food item in an expanded or food storage configuration. Note: Portions within the outer frame are depicted with hidden lines, and portions of the collapsible apparatus are shown translucent, for the sake of clarity. A food item is also depicted in the system.
Figure 1B:
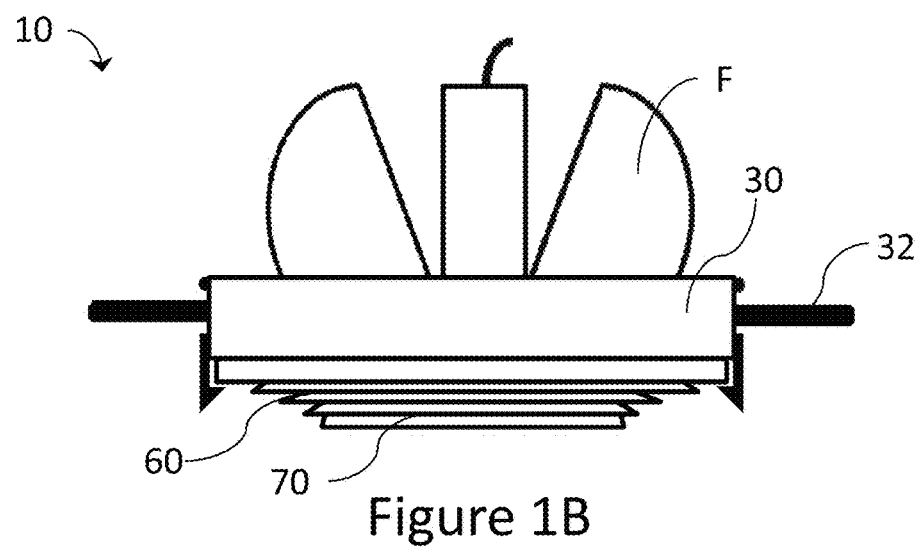
FIG. 1B is a side view of the system of FIG. 1A in a collapsed or food serving configuration. Note: the entire food item is not shown.

Finally, when the collapsible apparatus, or structures of the system are in the fully, mostly or substantially collapsed state, and the food item has been cut and most of the food item has traveled out of the system, it may be described herein that the system is in, or is configured in, a food serving configuration (e.g., fully, mostly or substantially collapsed, etc.). In some embodiments, a food serving configuration may be described as a configuration where the cut food exits (e.g., or most of the food has exited) the apparatus and is "served" or presented to the user for easy handling and consumption. As shown in the embodiment of FIG. 1B, the food serving configuration may be similar to being served on a plate as one would normally serve food for consumption.

As shown in FIGS. 1A-1E, the system 10 includes a cutting apparatus 20 and a collapsible apparatus 60. The cutting apparatus 20 is removably couplable to the collapsible apparatus 60. The system 10 may also include a cover 80 which may be coupled to the cutting apparatus 20 by cover retention feature 96. The cutting apparatus 20 and the collapsible apparatus 60 include features that may be used separately rather than as part of the system 10, but will be described herein as part of a system.

The cutting apparatus 20 includes an outer frame 30 that may be formed in a ring or circular shape defining an interior cutting region 31. Blades 40 may span interior cutting region 31. Outer frame 30 has an outer surface 30a and an inner surface 30b defining a thickness. In some embodiments, the thickness may be substantially even around the outer frame 30, in other embodiments the thickness may vary. The outer frame 30 may also be a rectangle, polygon, square, octagon, irregular or any other suitable shape, depending on the food item F intended to be cut.

Outer frame 30 may include an entrance surface 38 on the surface of the outer frame 30 or cutting device 20 that may be the surface most proximal to the collapsible apparatus 60 (e.g., bottom surface) when the outer frame 30 is coupled to collapsible apparatus 60. The entrance surface 38 may be intersected by entrance plane 28. Entrance surface 38 may also be the surface of the outer frame 30 or cutting device 20 that is closest to a cutting end portion 46 (e.g., edge) of blades 40 as discussed herein. Entrance surface 38 and entrance plane 28 may be perpendicular to or substantially perpendicular to outer surface 30a and/or inner surface 30b, and/or central axis 29.

Outer frame 30 may also include an exit surface 37 (e.g., top surface) opposite or distal from entrance surface 38 and may be intersected by exit plane 27. Exit surface 37 may also be the surface of outer frame 30 that is closest to a trailing end portion 48, or upper end 50 of blades 40. The exit surface 37 may be or the surface of outer frame 30 that is most distal a cutting end e portion 46, as discussed herein. Exit surface 37 may be perpendicular to or substantially perpendicular to outer surface 30a and/or inner surface 30b and/or central axis 29. The height of the outer frame 30 may be defined as the distance from the entrance surface 38 to the exit surface 37.

Outer frame 30 may be rigid and formed from plastic, stainless steel, other metals, ceramic, a combination of materials, a composite, or any other material of sufficient strength and durability to withstand the force required to pass the blades through the food item F. As shown in FIGS. 1A, 1B, 1D, 3A and 3B, the food item F may include foods such as an apple, but may also be any suitable food including, but not limited to, pears, citrus fruits including lemons, limes grapefruit and oranges, cheese, meat, potatoes, jicama, mango, sweet potatoes, tomatoes, radishes, water chestnut, carrots, peppers, banana and pineapple etc.

The cutting apparatus 20 includes one or more blades 40. In some embodiments, such as those directed to cutting apples or pears, the cutting apparatus 20 may include a central blade 42 (e.g., may be a ring shape or other suitable shape) which may be centrally located within the outer frame 30. The central blade 42 may serve to core the food item F. Extending blades 44 may extend away from the central blade 42 (e.g., radially or otherwise). In other words, the extending blades 44 may span the distance between the ring blade 42 and the outer frame 30. Each of the extending blades 44 may be identical or substantially similar to one another and may divide the annular space between the outer frame 30 and the central blade 42 into equal or unequal open portions 94. In some embodiments extending blades may extend across the outer frame 30 or between each other instead.

Figure 1C:
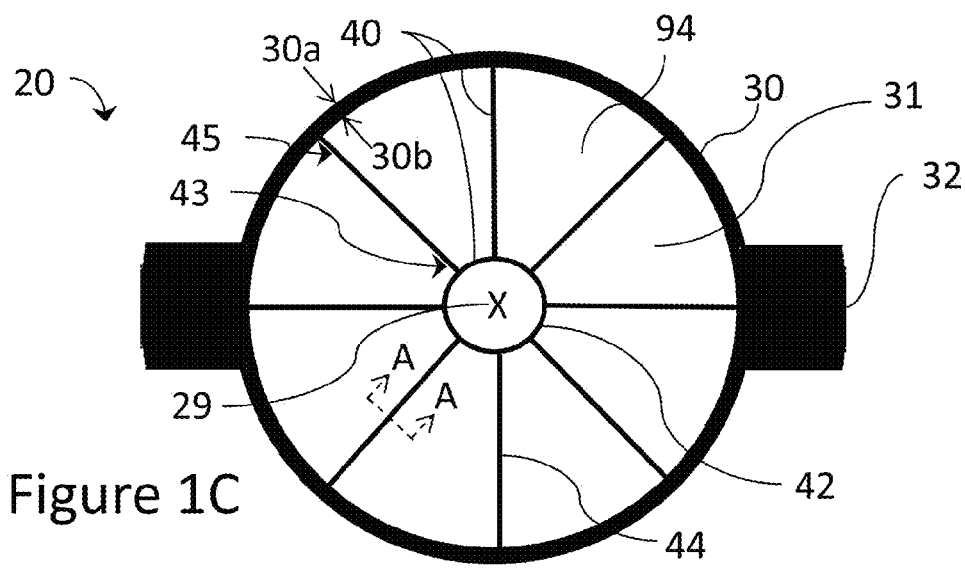
FIG. 1C is a top view of the cutting apparatus of the exemplary system of FIG. 1A.
Figure 1D:
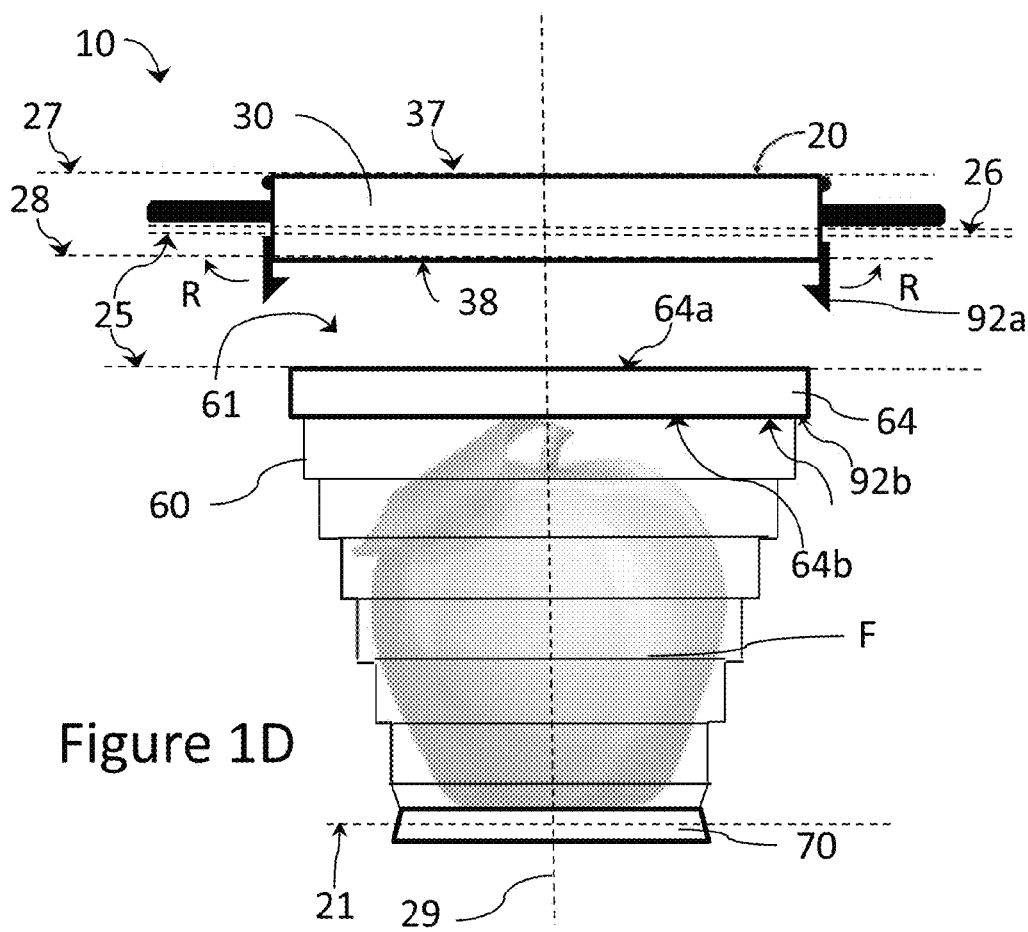
FIG. 1D is an side view of the system of FIG. 1A in a de-coupled configuration.
Figure 1E:
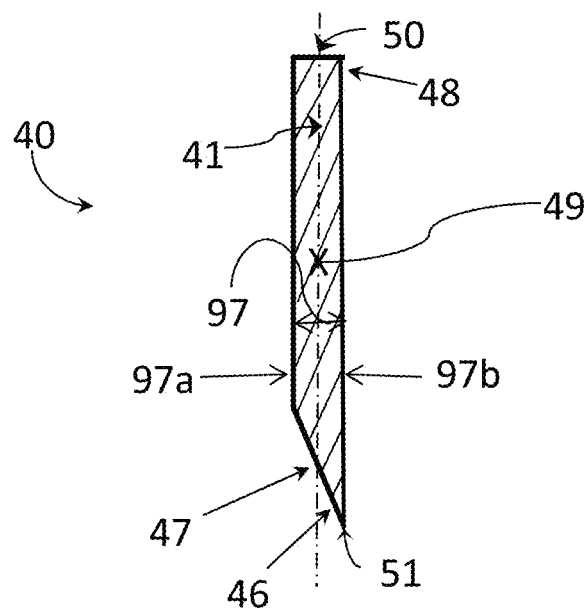
FIG. 1E is a example of a sectional view of a sharpened blade taken along line A-A in FIG. 1C.

FIG. 1E shows a sectional view of one embodiment of a blade 40 (42, 44) taken along line A-A in FIG. 1C. The cross section of both central blade 42 and extending blade 44 may be the same or similar. Thus for the sake of brevity, the sectional view of the blade will be discussed in relation to extending blades 44 herein, but features discussed may be applied to blade 42 as well. Each or any of the blades 44 may have a longitudinal length along the longitudinal axis 49 of the blade 44. Each of blades 44 extends a length from the first end 43 to the second end 45 along longitudinal axis 49 and may span a portion of the interior cutting region 31 of the outer frame 30. Each blade 44 may lie in respective blade planes 41.

Each or any of blades 40 has a thickness 97 from a first surface 97a to a second surface 97b. Blades 40 may include the cutting end (e.g., edge) portion 46, which may include a sharpened end (e.g., edge) portion 47 that may initiate the cutting process by penetrating food item F. The cutting end portion 46 may terminate at lower end 51. Blades 40 may also include the trailing end portion 48, terminating at upper end (e.g., edge) 50. The cutting end portion 46 of each or any of blades 40, may be sharpened, or knife-like (e.g., beveled, angled, chamfered, or narrowing in thickness towards the cutting end 46) to decrease the compressive force required to cut a food item F, allowing for easier cutting. As shown in FIG. 1E, the trailing end portion 48 (edge that may not initiate cutting) is located distal (e.g. opposite) to the cutting end portion 46 and may be unsharpened. However, in some embodiments, either or both of the cutting end portion 46 or the trailing end portion 48 may be sharpened, only one may be sharpened, or neither may be sharpened, or they may be sharpened to different degrees. The height of blades 40 may be defined as the distance from the upper end 50 to the lower end 51.

In one or more embodiments, when the cutting device 20 is coupled to collapsible device 60, the sharpened end(s) 47 of one or more blades 40 may face the base 70 of collapsible apparatus 60. In this configuration, the user is protected from sharpened ends 47 of the blades 40.

The cutting end portion 46, the sharpened end portion 47, or the lower end 51 may be proximate, adjacent, terminate at, or intersect a cutting plane 26, or alternatively at the entrance plane 28 of the cutting apparatus 20. The cutting plane 26 may defined by the plane, that when the food item crosses it, the blades 40 penetrate the food item, initiating the cutting process. Cutting plane 26 may perpendicular to, or substantially perpendicular to the central axis 29 and/or a surface of the outer frame 30 (30a, 30b). Cutting plane 26 may be parallel to or substantially parallel to any of the entrance plane 38, the exit plane 37, or base 70, including a top surface 72 or a bottom surface 74, or a plane intersection base 70 and perpendicular to or substantially perpendicular to central axis 29.

As depicted in FIG. 1E each or any of the blades 44 may have a respective blade plane defined by plane 41, although blades 44 need not be completely straight (e.g., may be wavy or non-linear). Blade plane 41 passes, or substantially passes through the blade 44 extending from a first end portion 43 to a second end portion 45, and from the cutting end portion 46 to the trailing end portion 48. Blade plane 41 may be perpendicular or substantially perpendicular to any of the exit plane 22, the coupling plane 24, and/or the entrance plane 26 of the cutting device 20 (although in some embodiments the blade plane 41 may not be perpendicular). Blade plane 41 of the extending blades 44 may also be perpendicular, or substantially perpendicular to central axis 28 of the outer frame 30 (although in some embodiments the blade plane 41 may not be perpendicular). The blades may be formed of metal, such as stainless steel, but may also be formed from ceramic, plastic, composites, or any other suitable material. In some embodiments, such as an embodiment for cutting foods such as cheese, wires (e.g., metal, plastic, etc.) may be provided in place of blades 40.

The cutting apparatus 20 is configured to be removably couplable to the collapsible apparatus 60, and/or vice-versa. The collapsible apparatus 60 may be attached to the cutting apparatus 20 at mating and force transfer surfaces 499a, 499b which are intersected by one or more mating and force transfer planes 25. The mating and force transfer surfaces (not shown in FIGS. 1A-1E, but shown in FIG. 4C as 499a, 499b provide a mating surface at which the compressive forces may be transmitted from the cutting apparatus (e.g., as in 420) to the collapsible apparatus (e.g., as in 460). The system may store the food item F within the system 10 in a cutting orientation. The collapsible apparatus 60 may also protect the user from the cutting end portions 46 of blades 40 when the collapsible apparatus 60 and the cutting apparatus 20 are coupled to each other in any of the food storage, food cutting or food serving configurations. The collapsible apparatus 60 and cutting apparatus 20 may be removably coupled via coupling mechanism 92a, as shown in the embodiment of FIGS. 1A-1D as engaging with an coupling mechanism 92b (the proximal end 64b of the open end portion 64 (e.g., frame, ring) of the collapsible apparatus). As shown in FIGS. 1A, 1B and 1D, a snap fit connection (e.g., tongue and groove type retention feature) may be engaged and disengaged along pivot path R.

Cutting apparatus 20 may further include handles 32 of sufficient strength and size to enable a user to apply a compressive pressure to the system 10, to cut the food item F.

Collapsible apparatus 60 (e.g., foldable apparatus) may be configured to completely or partially contain (hold, enclose, house, surround, cover receive, protect) a food item F when the food item F is placed into reservoir 61 of the collapsible apparatus 60 via open end portion 64 (e.g., frame, ring). Collapsible apparatus 60 may be a bowl, a cup, or any other suitable container, a flexible bag or enclosure for storing and/or supporting a food item and/or providing and integral and/or sanitary surface, via base 70, on which to cut the food item.

Collapsible apparatus 60 includes a collapsible region 62. Collapsible region 62 may extend all or a portion of the region between the open end portion 64 and base 70. Collapsible region 62 may include a variety of formations to facilitate collapsing, including, but not limited to living hinges or thin walled sections. In other embodiments, flexible materials with no formations may facilitate the collapsing mechanism. Any other suitable collapsing mechanism as is known in the art may be incorporated.

Base 70 may be configured to support food item F in all or any of the food storage configuration, a food cutting configuration, and a food serving configuration. Base 70 may include a bottom surface 74 most distal from the open end portion 64, and a top surface 72 opposite the bottom surface 74. The top surface 72 may be closer to the open end portion 64 than the bottom surface 74 when the collapsible apparatus 60 is in the expanded or food storage configuration.

Base 70 may be made of a material that is harder or more resistant to cutting than the collapsible region 62. Base 70 may be made of nylon, polypropylene, metal, ceramic, composites, glass, a combination of materials, or any other suitable material. In some embodiments, the material may be selected such that it is hard enough to withstand contact with the blades 40 without being damaged or is resistant to damage (e.g., contact without substantially affecting the structural integrity of the base 70). In one or more embodiments, the top surface 72 of base 70 may be made of a harder material than the bottom surface 74 of base 70. The bottom surface 74 of base 70 may further include grippy feet or high friction surfaces or features to prevent the base 70 of collapsible apparatus 60 from slipping during use. Base 70 may also be made of resilient or elastomeric material, and further may be integrally formed with collapsible region 62.

In one or more embodiments, at least a portion of base 70 may be formed as a condiment reservoir removably couplable to the system (e.g., to the collapsible apparatus). In some embodiments, at least a portion of the base 70 may be configured to hold and contain a condiment (e.g., carmel or other dip). All or a portion of base 70 may be configured to be removable (e.g., via threads or snap-fit attachment, or other suitable attachment), allowing the user to remove and access a condiment container in a portion of base 70. Alternatively, cover 80 could be configured as a removable condiment reservoir.

In one or more embodiments, as shown in FIGS. 1A-1D, the open end portion 64 of the collapsible apparatus 60 may be made of a material that is more rigid than the material of the collapsible region 62 (although in some embodiments, the open end portion 64 may be made of the same material as the collapsible region 62 or an altered version of the same material). The open end portion 64 may provide a variety of coupling surfaces or coupling features for connection with the cutting apparatus 20. The open end portion 64 may also provide stability to the collapsible region 62, both in static stability and/or during collapsing of the system. As shown in FIGS. 1A, 1B and 1D, the distal surface 64a (e.g., top surface, surface of open end portion 64 more distal from base 70) of open end portion 64 may be in contact with the coupling plane of the cutting device 20 when coupled. The proximal surface 64b (bottom surface, surface of open end portion 64 more proximal to the base 70 than the distal surface 64a) of the open end portion 64 may be proximate, adjacent to, affixed, coupled to, or directly coupled to the collapsible region 62. Proximal surface 64b may also provide a portion of the coupling mechanism 92b, as shown with the snap fit connection provided by coupling mechanism 92a when in contact with coupling mechanism 92b (e.g., proximal surface 64b) as shown in FIG. 1A. The coupling mechanism 92a, 92b may be release along release path R. Any suitable feature, including a separate feature for coupling to mechanism 92b, other than bottom surface 64b may be provided on open end portion 64.

Collapsible apparatus 60 may be reduced in size (e.g., height, volume) from a first configuration, or food storage configuration in which collapsible apparatus 60 is expanded and may store the food item F, to a second configuration or food serving configuration in which the collapsible apparatus 60 is collapsed and has cut the food item F and is configured to support a food item F and present it to a user for consumption. The food serving configuration can also be the same or similar to a non-use configuration (e.g., for storing the system 10 in a drawer or cabinet).

The food cutting configuration or intermediate configuration may include the range of sizes in between the food storage configuration and the food serving configuration (e.g., post-cut configuration), when the food item F is in the process of being cut.

In particular, collapsible apparatus 60 may accomplish this change in size by being collapsible or foldable (e.g., upon itself, pleated) in at least the collapsible region 62. In one or more embodiments all or a portion of the collapsible apparatus 60 or collapsible region 62 may be formed of a resilient or elastomeric material(s) such as silicone or silicone composites. In other embodiments, collapsible region 62 may be formed of woven or non-woven textiles, plastic, rubber, composites, or any other suitable material, or any combination of materials. The materials used in manufacturing of any or all components of the system 10 may be food grade materials, and may be reusable or disposable.

The collapsible apparatus 60 or system 10 may be collapsed (e.g., reduced in height and/or volume) from the food storage configuration to the food serving configuration. The food serving configuration may include a height or volume at least 75% less than the storage configuration. The food serving configuration may also include a height and/or volume at least 10% less, at least 20% less, at least 30% less, at least 40% less, at least 50% less, at least 55% less, at least 60% less, at least 70% less, at least 80% less, at least 85% less, at least 90% less or at least 95% less than the storage configuration, depending on which features and geometries are included in the system. In theory, the more the height and volume can be collapsed, the better, for the sake of compact storage. However, the reduction of height and/or volume must be within reason to allow for the following: sufficient blade 40 height for cutting, appropriate coupling of the cutting apparatus 20 to the collapsible apparatus 60, sufficient strength to outer frame 30, and to prevent contact of the blades 40 with the collapsible region 62 when the collapsible apparatus 60 is in the food serving configuration. In some embodiments a height or volume reduction of more than 50%, for example, 51% to 90% may be preferred to meet these criteria or even 55% o 90%, with a height or volume reduction of 65% to 90% being more preferable, and a height or volume reduction of at least 65% being sufficient, but a height or volume reduction of at least 75% being more preferable, and a height or volume reduction of at least 80% being even more preferable.

The height of the collapsible apparatus may be defined as the distance from the bottom surface 74 of the base 70 (which is the base surface most distal from the open end portion 64) to the distal surface 64a (top surface) of the open end portion 64. The height of the system 10 being defined as the distance from the bottom surface of the base 74 to the exit surface 37 of the outer frame, and may exclude any height contributed by handles 32.

The volume of the collapsible apparatus may be defined as either or both of an internal volume of the collapsible apparatus 60 and an external volume occupied by collapsible apparatus 60.

The external volume of the system 10 may be defined as the external volume occupied by the system 10, and may exclude handles 32. The internal volume of the system 10 may be defined as the internal volume contained within the system 10 from the top surface of the base 72 up to the exit surface 37, when the cutting apparatus 20 and the collapsible apparatus 60 are coupled.

The cutting apparatus 20 may be removably couplable to the open end portion of the collapsible apparatus 64 such that when the cutting apparatus 20 is coupled to the collapsible apparatus 60, the cutting apparatus 20 may closer to the base in the food serving configuration (e.g., second configuration) than in the food storage configuration (e.g., first configuration). In many embodiments, the cutting apparatus 20 does not move relative to the open end portion 64 of the collapsible apparatus 60 in any or all of a food storage configuration, a food cutting configuration, and a food serving configuration. However, in some embodiments, the cutting apparatus 20 may move relative to the open end portion 64 of the collapsible apparatus 60.

Figure 2:
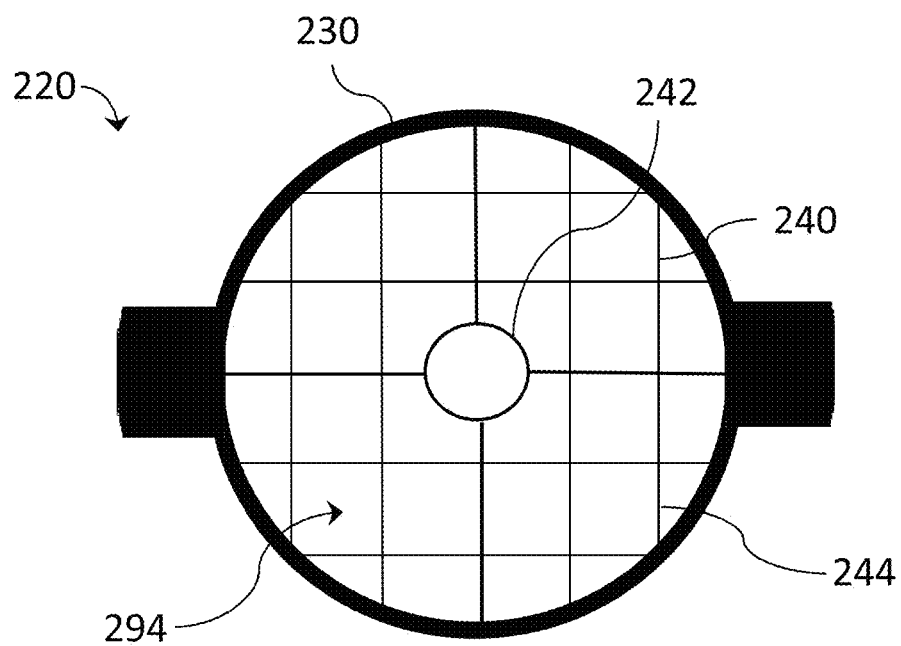
FIG. 2 is a top view of another exemplary cutting apparatus.

As shown in FIG. 2, other blade geometries are possible. In one or more embodiments, the cutting apparatus 220 may be substantially similar to cutting apparatus 20 in most respects other than blade arrangement. Cutting apparatus 220 may include an outer frame 230 and a central blade 242 as previously described. However, the remaining blades 244 need not necessarily radially extend from the central blade 242. For example, the blade configuration shown in FIG. 2 includes a right angled grid which may be provided with or without the central blade 242. In order to cut rectangular prisms (e.g., french fry shaped pieces), extending blades 244 may span and divide the annular space between the outer frame 230 and the central blade 242 into open portions 294. The open portions may be square or mostly square sections with some irregular shaped sections. The irregular shaped sections may be located anywhere, but as shown in FIG. 2, are specifically near or directly adjacent to the central blade 242 and near or directly adjacent to the outer frame 230. In other words, the extending blades form a grid of blades surrounding the central blade 242. Other embodiments, a grid including acute and obtuse angles instead of right angles may be provided, resulting in parallelogram, or other polygonal shapes.

Another exemplary system 310 for storing, cutting and serving a food item F is depicted in FIGS. 3A-3B. Several features and/or portions of the exemplary system 310 may be similar to the exemplary system 10 described herein with reference to FIGS. 1A-1E. For example, the outer frame 330, blades 340, planes 325-329, central axis 329, portions of base 370, portions of cutting apparatus 320 and collapsible apparatus 360 and subcomponents thereof, may be similar to the outer frame 30, blades 40, planes 25-28, central axis 29, portions of base 70, portions of cutting apparatus 20 and collapsible apparatus 60, and subcomponents thereof of the apparatus of FIGS. 1A-1E. Further, for example, the food storage configuration, the cutting configuration and the serving configuration and mechanisms of the exemplary system 310 may be similar to the food storage configuration, the cutting configuration and food serving configuration and mechanisms of the exemplary system 10. As such, such features and/or portions may not be further descried herein or may not be described in the same level of detail, and it is to be understood that one or more such features and/or portions may be used interchangeably between each and every embodiment described herein.

As shown in the embodiment of FIGS. 3A-3B, the coupling mechanisms 392a (depicted by hidden lines), 392b may include threads 365. Threads 365 may be arranged in any suitable manner within the structures of the system to facilitate coupling. Threads 365 may be provided as shown, or may be provided in any suitable arrangement. For example, in some embodiments, the threads 365 could be located on the external circumferential surface of the outer frame 30, and the mating threads could be located on the inner surface of the open end portion 364 of collapsible apparatus 60.

FIGS. 3A-3B depict a handle construction that may be incorporated into one or more embodiments, including handles 332 which may be movable between a storage configuration and a cutting configuration. The handles 332 may be more compactly arranged with respect to the cutting apparatus 320 in the storage configuration than in a cutting configuration. The handles 332 of FIGS. 3A-3B may also act as a cover for the food item F and/or blades 340 (not shown) of the cutting apparatus 320 (e.g., during travel). The handles 332 in the depicted embodiment may be pivotable around an axis through point 336 along path O. In other embodiments, the handles 332 may be slidable in/out of slots in outer frame 330 or pivotable about an axis other than an axis through point 336. For example, in some embodiments, the handle may be pivotable around an axis passing through the outer frame 330 that is parallel to central axis 329). A stop feature 334 may be provided on the outer frame 330, or on the handle 332, or any other component of the system to stop the handle 332 from rotating too far to be effective for transferring a compressive force applied to handle 332 to the system 310 to collapse system 310.

As shown in FIGS. 3A-3B, in some embodiments, the collapsible region 362 may or may not necessarily include geometric formations to facilitate collapsing apparatus 360. In these embodiments, the material chosen may have favorable collapsing characteristics, even in the absence of geometric formations to facilitate collapsing.

Another exemplary system 410 for storing, cutting and serving a food item F is depicted in FIGS. 4A-4C. Several features and/or portions of the exemplary system 410 may be similar to the exemplary system 10 described herein with reference to FIGS. 1A-1E. For example, the outer frame 430, blades 440, planes 425-428, central axis 429, portions of base 470, portions of cutting apparatus 420 and collapsible apparatus 460, open end portion 464 and subcomponents thereof, may be similar to the outer frame 30, 230, 330, blades 40, 240, 340, planes 425-428, central axes 29, 329, 429, bases 70, 370, open end portions 64, 264, 364, portions of cutting apparatus 20, 220, 320 and collapsible apparatus 60, 360, and subcomponents thereof of the apparatus of FIGS. 1A-1E, 2 and 3A-3B. Further, for example, the food storage configuration, the cutting configuration and the serving configuration and mechanisms of the exemplary system 410 may be similar to the food storage configuration, the cutting configuration and food serving configuration and mechanisms of the exemplary system 10, 210, 310. As such, such features and/or portions may not be further described herein or may not be described in the same level of detail, and it is to be understood that one or more such features and/or portions may be used interchangeably between each and every embodiment described herein.

As shown in FIG. 4A, in some embodiments, coupling mechanism 492a (e.g., a locking pin) and coupling mechanisms 492b (e.g., a slot) may be used as the coupling method. Locking pin 492 and slot 493 may be arranged anywhere on the system suitable for facilitating removable coupling of the cutting apparatus 420 to the collapsible apparatus 460. Any other suitable removable attachment feature or method as is known in the art may also be utilized.

As shown in further detail in the embodiments of FIGS. 4A-4C, the collapsible apparatus 460 has an inner surface 462 and an outer surface 462b defining a thickness, which may vary. Collapsible apparatus 460 may include geometric formations to facilitate collapsing and expanding of the collapsible apparatus 460. In one or more embodiments the collapsible region 462 may include one or more hinges 466a-d (e.g., living hinges or thin walled portions) to enable the collapsible apparatus 460 to collapse and expand.

In one or more embodiments, the collapsible region 462 may be arranged to expand in a manner that the diameter of each successive layer is larger than the diameter of its preceding layer the further the layer is from the base 470 (e.g. diameter of 468a may be larger than diameter of 468b; 468b may be larger than the diameter of 468c; and so on and so forth, etc.).

FIG. 4C depicts an embodiment of the collapsible apparatus 460 of 4A and 4B in the collapsed or folded configuration. As shown in FIG. 4C, the vertical profile of the collapsible apparatus 460 may be reduced dramatically from the expanded state depicted in FIGS. 4A and 4B. The collapsible region 462 may fold at each of the thin walled sections 466. In the collapsed configuration, the thin walled sections 466 and thick walled sections 468 form pleated region 467 in the flexible material of the collapsible region 462. When collapsed, at least a portion of the cross section of the collapsible apparatus 460 in the region of the pleated region 467 exhibits a zig-zag pattern.

Referring to FIG. 4C, although blades 440 are shown as spanning the height of the outer frame 430 defined as the distance from the entrance surface 438 to exit surface 437, blades 440 need not span the entire height of the outer frame 430. In some embodiments, blades 440 may not extend all the way to exit surface 437, or may not extend all the way to entrance surface 438. In other words, the outer frame 430 may have a height greater than the blades 440, (the height of the blades defined as the distance from the cutting end portion 46 to trailing end portion 48, as shown in FIG. 1E). In some embodiments, the height of at least a portion of the blade 440 may be greater than the height of the outer surface, or may extend below or above the entrance plane 428 or exit plane 427.

In order to protect the collapsible region 462 of the collapsible apparatus 460 from damage due to blades 440, a gap 498 may be maintained between the cutting end portion 446 of blades 440 and a collapsed plane 469. Collapsed plane 469 may be defined as a plane through the portion of the collapsible region 462 most distal from the base 470 (e.g., as shown in FIG. 4C as the collapsible region inner surface 462a, at or near hinge 466b). The collapsed plane 469 may also perpendicularly intersect central axis 429.

Gap 498 between the blades 440 and collapsible region 460 may also be maintained by the geometric relationship between the coupling surfaces 499a and 499b, and the blades 440. In other words, the mating and force transfer surfaces 499a, 499b are intersected by mating and force transfer plane 425, and may be arranged such when they are coupled together, they are sized, dimensioned and/or placed to prevent the blade from moving too far into collapsible apparatus 460.

FIG. 5, is an embodiment of a system 510, including cutting apparatus 520 and collapsible apparatus 560 that is substantially the same in all respects as the embodiment of FIGS. 4A-4C, except for the base 570. In FIG. 5, the gap 598 may be maintained, at least in part, by the location of the top surface of the base 572, or the protrusion height 576 of base 570. As shown in FIG. 5, in one or more embodiments, the top surface of the base 572 limits travel and prevents the blades 540 from coming into contact with the collapsible region 562 (e.g., living hinges 466b, etc.) when in the collapsed configuration.

FIGS. 6A-B depicts embodiments of a base 670 that may be used or included in one or more embodiments, including any of the embodiments disclose herein (e.g., 70, 370, 470, 570). Base 670 may include central protrusions 676 and/or general protrusions 678 extending from the top surface 672 in a direction opposite the bottom surface of the base 674. Central protrusion 676 is a centrally located protrusion with respect to the base. In FIGS. 6A-B, general protrusions 678 are shown surrounding central protrusion 676, but may be provided in any suitable manner. Protrusions 676 and 678 may be oriented to occupy the open portions (e.g., 94 in FIG. 1C) and not come into contact with the blades 440. Protrusions 676 and 678 serving to allow further travel of the blades 640 (not shown) past at least a portion of the base 670 (including protrusions 676, 678) and further with respect to the food item F so as to more completely cut the food item F.

FIG. 6A further depicts a food retention feature 679a which is configured to and capable of penetrating or piercing the food item F so as to provide additional support, stability and retention of a food item F. This is especially helpful during travel and/or cutting so that the food item F does not move out of place during travel and/or cutting, keeping the food item F in the desired orientation. In one or more embodiments, the protrusions 676, 678 and the food retention feature 679a may all be provided together, or only one or two of the features may be provided in a particular embodiment. These features may be completely independent of one another and may be provided in any combination, including providing the food retention feature 679a without protrusions 676 and/or 678 and vice-versa, or only protrusions 678, or only protrusion 676, etc.

FIG. 6B is substantially similar in all respects to FIG. 6A, except FIG. 6B depicts another embodiment of a food retention feature 679b. The food retention feature shown in FIG. 6B may be of a geometry that pierces the food item F over an area of the food item F. As shown, food retention feature 679b is a circular projection that is hollow in the middle, although in some embodiments, a combination of both food retention features 679a and 679b. Any suitable food retention feature, covering any portion of the base 670 may be provided. In some embodiments, the food retention feature 679a, 679b occupies an area of the base 670 such that when the collapsible apparatus (e.g., 460) is in the collapsed position, the food retention feature 679 does not interfere with the blades 40 (e.g., occupies the space within the diameter of the central blade 42 when the system 10 is in the collapsed position). In one or more embodiments, additional food retention features may be included in the area occupied by projections 678 as shown in FIG. 6B.

An embodiment of the method of using the present invention will be described with reference to FIG. 7. FIG. 7 depicts a flow chart of one embodiment of an exemplary method for storing, cutting and serving a food item using any of the systems and features described in FIGS. 1-6.

In step 710, the user provides a system 10 including a cutting apparatus (e.g., 20) and a collapsible apparatus (e.g., 60). In step 720, the user places a food item F into the collapsible apparatus 60. If a food retention feature (e.g., 679a or 679b) is present, the user presses the food item F into the food retention feature 679a or 679b.

In step 730, the user couples the cutting apparatus 20 to the collapsible apparatus 60 in a first system configuration having a first volume or height. The first system (or collapsible apparatus) configuration may be the storage configuration.

In step 740, starting with the system 10 in the storage configuration, and without decoupling the cutting apparatus 20 from the collapsible apparatus 60, the user applies a compressive force to collapse or fold the collapsible apparatus 60 or system 10 to a second system (or collapsible apparatus) configuration having a second volume or height, simultaneously cutting the food item F during the transition from the first system configuration to the second system configuration. The transition from the first system configuration to the second system configuration may be a cutting configuration.

In one or more embodiments, collapsing the collapsible apparatus (e.g., 60) results in the system (e.g., 10) being reduced from a first configuration having a first height and first volume to a second configuration having a second height and second volume, wherein the first height is greater than the second height, and the first volume is greater than the second volume. Any reduction in height or volume discussed with respect to any embodiment herein, may be applied to the method. For example, the second height may be at least 51% less than the first height; or, the second height may be at least 65% less than the first height.

In step 750, without decoupling the cutting apparatus 20 from the collapsible apparatus 60, the system 10 supports the food item F via the collapsible apparatus 60 in the second system configuration. In the second system configuration the user may access the cut food item F and may access the cut food item F without having to access any interior volume within the bounds of the structure of the system 10 to remove at least a portion of the cut food item F. The second system configuration may be a food serving configuration.

In some embodiments of the method, in-between step 730 and 740, steps may be included to open or extend handles (e.g., 332) from a storage or covering position as depicted in the system of FIG. 3A, to an open orientation or cutting configuration as depicted in FIG. 3B.

In some embodiments of the method, a slightly collapsed position may be considered a food storage position depending on the size of the food item F. The food item F may be stored with the collapsible apparatus 20 just slightly collapsed, and/or the blades 40 just partially penetrating the food item F which may hold the food item F in place in the system 10 during transport. This serves to eliminate, reduce or limit, or prevent the food item F from being damaged by rolling around inside the system 10 during travel by holding the food item F in a particular position/location within the collapsible apparatus 20 without actually cutting the food item F into separate pieces.

Any of the features described in the above embodiments may be combined or eliminated to form additional embodiments that fall within the scope of the present invention.

Any patents, patent documents, and references cited herein are incorporated in their entirety as if each were incorporated separately. This disclosure has been provided with reference to illustrative embodiments and is not meant to be construed in a limiting sense. As described previously, one skilled in the art will recognize that other various illustrative applications may use the techniques as described herein to take advantage of the beneficial characteristics of the system and methods described herein. Various modifications of the illustrative embodiments, as well as additional embodiments of the disclosure, will be apparent upon reference to this description.

What is claimed is:

1. A method for storing a food item prior to cutting the food item, for cutting the food item, and for supporting the food item after it has been cut, the method comprising:
   receiving a collapsible apparatus comprising a base configured to support the food item during a cutting process, wherein the collapsible apparatus comprises an open end portion, a base, and a collapsible region, wherein the collapsible region extends between the base and the open end portion, and wherein the collapsible region is configured to collapse;
   expanding the collapsible apparatus;
   placing the food item into the collapsible apparatus;
   coupling a cutting apparatus comprising an outer frame defining an interior cutting region to the collapsible apparatus, wherein the interior cutting region comprises one or more blades being supported by the outer frame;
   collapsing the collapsible apparatus, wherein collapsing the collapsible apparatus results in the food item being cut and passing at least a portion of the food item through the interior cutting region and out of the collapsible apparatus; and
   wherein collapsing the collapsible apparatus results in the system being reduced from a first configuration having a first height and first volume to a second configuration having a second height and second volume, wherein the first height is greater than the second height, and the first volume is greater than the second volume.

2. The method according to claim 1, further comprising presenting the cut food item to a user when the collapsible apparatus is in a collapsed configuration without de-coupling the cutting apparatus from the collapsible apparatus.

3. The method of claim 1, further comprising piercing the food item with a food retention feature of the base, when placing the food item into the collapsible apparatus, to retain the food item during travel.

4. The method of claim 1, wherein the second height is at least 51% less than the first height.

5. A system for storing a food item prior to cutting, for cutting the food item, and for supporting the food item after it has been cut, the system comprising:
- a cutting apparatus comprising an outer frame defining an interior cutting region, wherein the interior cutting region comprises one or more blades being supported by the outer frame; and
- a collapsible apparatus comprising a base configured to support the food item during the cutting process, an open end portion, and a collapsible region configured to collapse, wherein the collapsible region extends between the base and the open end portion;
- wherein the cutting apparatus is removably couplable to the open end portion of the collapsible apparatus.

6. The system of claim 5, wherein at least one of the blades comprises a sharpened edge facing the base of the collapsible apparatus in all of a food storage configuration, a food cutting configuration, and a food serving configuration.

7. The system of claim 5, further wherein the system is configured to operate while maintaining the coupling between the cutting apparatus and the open end portion of the collapsible apparatus, wherein operating comprises the system moving between a food storage configuration, a food cutting configuration, and a food serving configuration, and all transitions therebetween, including the operation of food cutting.

8. A system for storing a food item prior to cutting, for cutting the food item in a cutting process, and for supporting the food item after it has been cut, the system comprising:
- a cutting apparatus comprising an outer frame defining an interior cutting region, wherein the interior cutting region comprises one or more blades being supported by the outer frame; and
- a collapsible apparatus comprising a base configured to support the food item during the cutting process, an open end portion, and a collapsible region configured to collapse, wherein the collapsible region extends between the base and the open end portion, further wherein the collapsible region is configured to collapse during the cutting process;
- wherein the cutting apparatus is removably couplable to the open end portion of the collapsible apparatus, and wherein the coupled system comprises a first configuration having a first volume and a first height and a second configuration having a second volume and a second height, wherein the first volume is greater than the second volume, and the first height is greater than the second height; and
- wherein when the cutting apparatus is coupled to the collapsible apparatus, the cutting apparatus being closer to the base in the second configuration than in the first configuration.

9. The system of claim 8, wherein the first configuration is a food storage configuration and wherein the second configuration is a food serving configuration and further wherein the transition between the first configuration and second configuration is a food cutting configuration.

10. The system of claim 9, wherein at least one of the blades comprises a sharpened edge facing the base of the collapsible apparatus in all of the food storage configuration, the food cutting configuration, and the food serving configuration.

11. The system of claim 9, wherein at least one of the blades comprises a chamfer on the edge of the blade facing the base when the cutting apparatus is coupled to the collapsible apparatus.

12. The system of claim 9, wherein the cutting apparatus does not move relative to the open end of the collapsible apparatus in all of a food storage configuration, a food cutting configuration, and a food serving configuration.

13. The system of claim 9, wherein the cutting apparatus does not move relative to the open end portion of the collapsible apparatus during the cutting process.

14. The system of claim 9, wherein the cutting apparatus comprises handles configured to receive the force to cut the food item, and further wherein the handles also provide at least a partial covering the of the interior cutting region.

15. The system of claim 9, wherein the collapsible apparatus comprises a resilient material.

16. The system of claim 9, wherein a gap is maintained between the blades and the collapsible region when the cutting apparatus is coupled to the collapsible apparatus in all of the food storage configuration, the food cutting configuration and food serving configuration.

17. The system of claim 9, wherein the base comprises a food retention feature configured to receive, pierce and retain the food item in the food storage configuration.

18. The system of claim 8, wherein the open end of the collapsible apparatus comprises at least a portion of a coupling mechanism configured to allow coupling of the cutting apparatus to the collapsible apparatus.

19. The system of claim 8, wherein the base of the collapsible apparatus comprises one or more projections having a height extending from a surface of the base towards the open end of the collapsible apparatus, and further wherein when the cutting apparatus and the collapsible apparatus are in the fully collapsed configuration, the blades occupy the space in between, but not in contact with the protrusions.

20. The system of claim 8, wherein a cross section of the collapsible apparatus in the second configuration taken along a plane substantially perpendicular to the plane of the base and/or substantially perpendicular to the plane of the open end the collapsible apparatus includes a zig-zag portion.

* * * * *